US012775870B2

(12) United States Patent
Li et al.

(10) Patent No.: US 12,775,870 B2
(45) Date of Patent: Oct. 27, 2026

(54) FEDERATED TRAINING OF MACHINE LEARNING MODELS

(71) Applicant: INTERNATIONAL BUSINESS MACHINES CORPORATION, Armonk, NY (US)

(72) Inventors: Shuo Li, Beijing (CN); Meng Wan, Beijing (CN); A Peng Zhang, Xian (CN); Xiaobo Wang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 17/245,363

(22) Filed: Apr. 30, 2021

(65) Prior Publication Data

US 2022/0351069 A1 Nov. 3, 2022

(51) Int. Cl.

*G06N 3/098* (2023.01)
*G06N 3/00* (2023.01)
*G06N 20/00* (2019.01)

(52) U.S. Cl.

CPC ............... *G06N 20/00* (2019.01); *G06N 3/00* (2013.01); *G06N 3/098* (2023.01)

(58) Field of Classification Search

CPC .......... G06N 20/00; G06N 3/00; G06N 3/098; G06N 3/045; H04L 67/10; H04L 67/568

(Continued)

(56) References Cited

U.S. PATENT DOCUMENTS

| | | | |
|---|---|---|---|
| 8,027,938 | B1 | 9/2011 | Xu et al. |
| 8,359,223 | B2 | 1/2013 | Chi et al. |

(Continued)

FOREIGN PATENT DOCUMENTS

| | | |
|---|---|---|
| CN | 110119474 A | 8/2019 |
| CN | 110443067 | 11/2019 |

(Continued)

OTHER PUBLICATIONS

Popa, "3 ways to train a secure machine learning model", https://www.ericsson.com/en/blog/2020/2/training-a-machine-learning-model, Feb. 5, 2020, 8 pages.

(Continued)

*Primary Examiner* — Mohamed Abou El Seoud

(74) *Attorney, Agent, or Firm* — Seed Intellectual Property Law Group LLP

(57) ABSTRACT

The invention provides a federated model based on locally trained machine learning models. In embodiments, a method includes: monitoring, by a computing device, cached data of an entity in a networked group of entities for changes in data, wherein the cached data includes model output data from worker models and a master feature model of the entity, and wherein the worker models and the master model comprise machine learning models; iteratively updating, by the computing device, parameter weights of the worker models and the master feature model based on the monitoring, thereby generating updated worker models and an updated master feature model; and providing, by the computing device, the updated worker models and an updated master feature model to a remote federated server for use in a federated model incorporating the updated worker models and an updated master feature model of the entity with other updated master feature models and other updated worker models of other entities in the networked group of entities.

16 Claims, 12 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 9,356,883 | B1 | 5/2016 | Borthakur | |
| 2012/0016816 | A1 | 1/2012 | Yanase et al. | |
| 2018/0026905 | A1 | 1/2018 | Balle et al. | |
| 2018/0212842 | A1 | 7/2018 | Ganguli et al. | |
| 2018/0330231 | A1* | 11/2018 | Gu | G06N 3/08 |
| 2019/0171978 | A1* | 6/2019 | Bonawitz | G06F 16/95 |
| 2019/0180386 | A1* | 6/2019 | Gandhi | G06F 16/29 |
| 2019/0227980 | A1 | 7/2019 | McMahan et al. | |
| 2021/0249139 | A1* | 8/2021 | Thakore | G06V 30/424 |
| 2021/0374617 | A1* | 12/2021 | Chu | G06N 20/20 |
| 2022/0029971 | A1* | 1/2022 | Gharibi | G06N 3/0499 |
| 2022/0201021 | A1* | 6/2022 | Joshi | H04L 63/1416 |
| 2022/0206865 | A1* | 6/2022 | Voruganti | G06N 20/00 |
| 2022/0343167 | A1* | 10/2022 | Chawla | G06N 5/01 |
| 2023/0065937 | A1* | 3/2023 | Satheesh Kumar | G06N 20/00 |
| 2023/0419172 | A1* | 12/2023 | Ickin | G06N 20/20 |

FOREIGN PATENT DOCUMENTS

| | | | | |
|---|---|---|---|---|
| CN | 111291900 | A | 6/2020 | |
| CN | 111537945 | | 8/2020 | |
| CN | 117616436 | A | 2/2024 | |
| GB | 2620539 | A | 1/2024 | |
| JP | 2012-022558 | A | 2/2012 | |
| JP | 2024-517749 | A | 4/2024 | |
| WO | 2021071399 | | 4/2021 | |
| WO | WO-2022119929 | A1 * | 6/2022 | G06N 20/00 |
| WO | 2022/227792 | A1 | 11/2022 | |

OTHER PUBLICATIONS im et al., "Federated Learning in Mobile Edge Networks: A Comprehensive Survey", Feb. 28, 2020, 34 pages.
Chawla, "Top Technologies to Achieve Security and Privacy of Sensitive Data in AI Models", https://analyticsindiamag.com/top-technologies-to-achieve-security-and-privacy-of-sensitive-data-in-ai-models/, Sep. 26, 2020, 6 pages.
Mell et al., "The NIST Definition of Cloud Computing", NIST, Special Publication 800-145, Sep. 2011, 7 pages.
Anonymous, "Linear regression", Wikipedia, https://en.wikipedia.org/wiki/Linear_regression, accessed Mar. 17, 2021, 20 pages.
Brownlee, "Regression Metrics for Machine Learning", https://machinelearningmastery.com/regression-metrics-for-machine-learning/, Jan. 20, 2021, 22 pages.
International Search Report and Written Opinion of the International Searching Authority dated Apr. 28, 2022 in PCT Application No. PCT/CN2022/076297, 9 pages.
Japan Patent Office, "Notice of Reasons for Refusal" Aug. 26, 2025, 08 Pages, JP Application No. 2023-566649.
The State Intellectual Property Office of People's Republic of China, "First Office Action", Apr. 3, 2026, 20 Pages, CN Application No. 202280046666.3.
Yang Junyuan, "Research on Personal Credit Evaluation Based on Mobile Telecom Data", Thesis, Information and Communication Engineering, Beijing University of Posts and Telecommunications, May 27, 2019, 80 pages (English abstract only).
The State Intellectual Property Office of People's Republic of China, "Second Office Action", Jun. 17, 2026, 7 Pages, CN Application No. 202280046666.3.

* cited by examiner

FEDERATED TRAINING OF MACHINE LEARNING MODELS

BACKGROUND

Aspects of the present invention relate generally to machine learning and, more particularly, to federated training of machine learning modules.

In general, machine learning is the use of algorithms and statistical models by computers to analyze and draw inferences from patterns in data in order to learn and adapt without following explicit instructions. Machine learning algorithms build models based on sample data (e.g., training data) in order to make predictions or decisions without being explicitly programed to do so. Machine learning models may learn and adapt over time utilizing incoming data in a particular domain (e.g., subject area). Data privacy concerns may limit the amount of data available to a computer system, and may therefore impact the quality or quantity of data available to train and/or update machine learning models.

Federated architecture (FA) is a pattern in enterprise architecture that allows interoperability and information sharing between semi-autonomous de-centrally organized lines of business (LOBs), information technology systems and applications. Federated learning (collaborative learning) is a machine learning technique that trains an algorithm across multiple decentralized edge devices or servers holding local data samples, without exchanging the data samples. This approach differs from traditional centralized machine learning techniques where all the local datasets are uploaded to one server. In general, federated learning enables multiple actors to build a common, machine learning model without sharing data. In one federated approach, parties jointly train a global machine learning model with the help of a centralized aggregator, by exchanging summaries of their individual data. Although only summaries of the parties' data are shared, the summaries may still reveal significant private or sensitive information. Accordingly, there is a need for systems and methods that address data privacy concerns while enabling the building and training of machine learning models utilizing the private data of multiple participating parties.

SUMMARY

In a first aspect of the invention, there is a computer-implemented method including monitoring, by a computing device, cached data of an entity in a networked group of entities for changes in data. The cached data includes model output data from worker models and a master feature model of the entity. The worker models and the master feature model comprise machine learning models. The method also includes iteratively updating, by the computing device, parameter weights of the worker models and the master feature model based on the monitoring, thereby generating updated worker models and an updated master feature model. The method also includes providing, by the computing device, the updated worker models and the updated master feature model to a remote federated server for use in a federated model incorporating the updated worker models and the updated master feature model of the entity with other updated master feature models and other updated worker models of other entities in the networked group of entities. Advantageously, such a method enables the generation of a federated model incorporating updated machine learning models from multiple entities in a networked group of entities, without the need to generate an intermediate model requiring updates at the local entity level.

In implementations, the model output data from the master feature model and the worker models is generated based on private data inputs by the entity. Thus, embodiments of the invention enable a federated model to utilize master feature models and worker models generated based on private data inputs by respective entities, without the need for the federated model to access the private data.

In embodiments, the method further includes determining, by the computing device, an accuracy of the worker models and the master feature model of the entity. In embodiments, iteratively updating the parameter weights of the worker models and the master feature model of the entity is further based on the accuracy of the master feature model and the worker models of the entity. Thus, embodiments of the invention provide a federated server with worker and master feature models that are updated based on accuracy, thereby increasing the accuracy of a federated model utilizing the updated worker and master feature models.

In another aspect of the invention, there is a computer program product including one or more computer readable storage media having program instructions collectively stored on the one or more computer readable storage media. The program instructions are executable by a computing device to monitor cached data of an entity in a networked group of entities for changes in data. The cached data includes output data from worker models and a master feature model of the entity. The worker models and the master feature model include machine learning models. The program instructions are further executable to iteratively update parameter weights of the worker models and the master feature model based on the monitoring, thereby generating updated worker models and an updated master feature model. Further, the program instructions are executable to provide the updated master feature model and the updated worker models to a remote federated server for use in a federated model incorporating the updated master feature model and the updated worker models of the entity with other updated master feature models and other updated worker models of other entities in the networked group of entities. Advantageously, such computer program products enable the generation of a federated model incorporating updated machine learning models from multiple entities in a networked group of entities.

In implementations, the model output data from the worker models and the master feature model is generated based on private data inputs by the entity. Thus, embodiments of the invention enable a federated model to utilize a master feature model and worker models generated based on private data inputs by respective entities.

In another aspect of the invention, there is system including a processor, a computer readable memory, one or more computer readable storage media, and program instructions collectively stored on the one or more computer readable storage media. The program instructions are executable by a federated server to receive an inquiry from a participating member of a networked group of entities. The program instructions are further executable to generate a federated model based on master feature models and worker models of respective entities in the networked group of entities. Additionally, the program instructions are executable to generate a response to the inquiry based on an output of the federated model. Further, the program instructions are executable to send the response to the inquiry to the participating member. The master feature models each include all features of a respective entity in the networked group of entities. The worker models each include a subset of all the features of a respective entity in the networked group of entities. Additionally, the master feature models and the worker models are iteratively updated by the respective entities based on private data not accessible by the federated server. Advantageously, such systems enable a federated server to respond to inquiries based on models of multiple participating entities, without the federated server having access to private data of the entities.

In implementations, the program instructions of the system are further executable by the computing device to generate a vector map representing relationships between multiple remote entities based on public information. In embodiments, the program instructions are further executable to identify the networked group of entities from multiple remote entities based on the vector map. Thus, embodiments of the invention build a network of related entities whose master feature and worker models may be utilized in a federated model available to participating members of the network.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
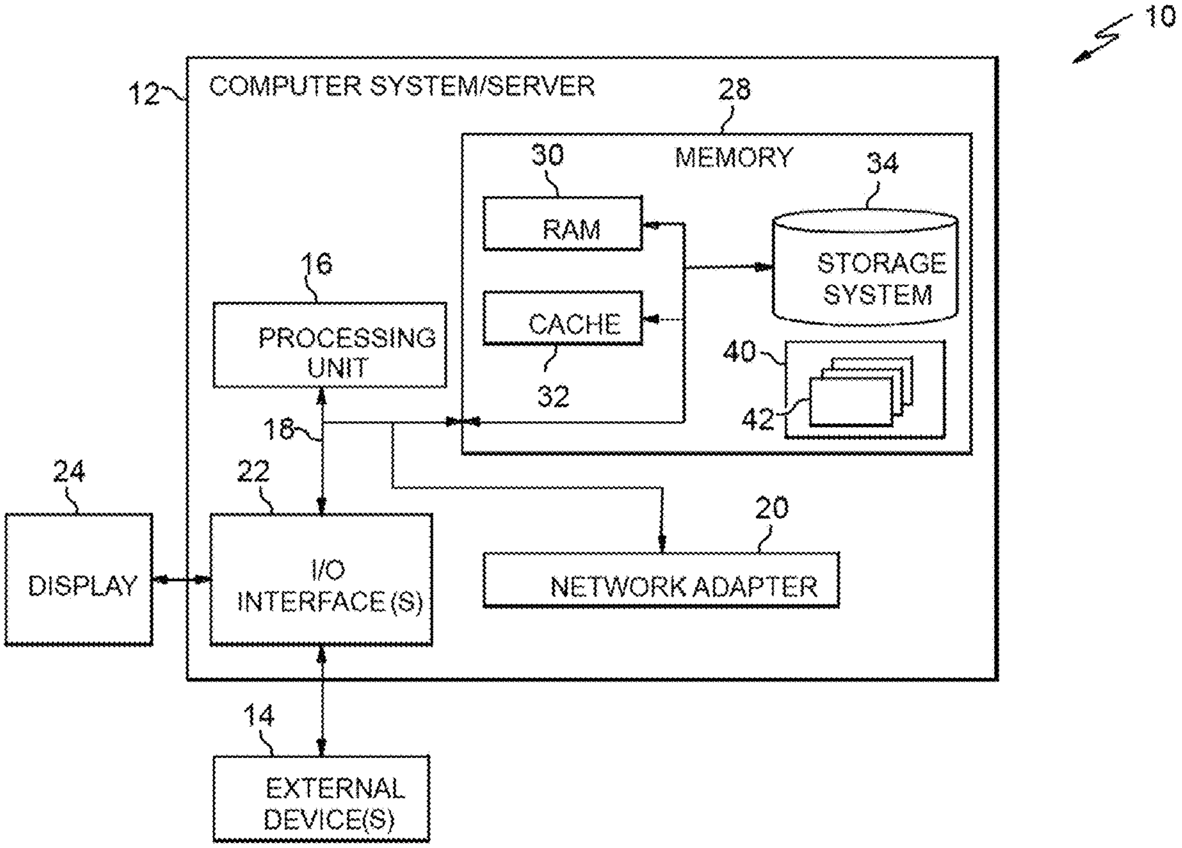
FIG. 1 depicts a cloud computing node according to an embodiment of the present invention.

Aspects of the present invention relate generally to machine learning and, more particularly, to federated training of machine learning modules. According to aspects of the invention, a system is provided to set up master feature-level models (hereafter master feature models) and worker feature-level models (hereafter worker models) together with a federated model-level dynamic virtual learning network of individual entities for accurate prediction against sensitive data.

The use and development of computer systems that utilize machine learning models to learn and adapt without following explicit instructions is on the rise. Concerns regarding the use of data to update or improve machine learning models over time include availability of data, as well as data privacy or sensitivity issues. Data privacy may be governed by individual or entity preferences, as well as governmental regulations. For example, the General Data Protection Regulation (GDPR) is a European Union law directed to data privacy and security. Data privacy concerns may limit the amount of data available to a computer system, and may therefore impact the quality or quantity of data available to train and/or update machine learning models.

Embodiments of the invention implement a technical solution to resolve the technical problem of building and updating machine learning models when data access is limited by the availability of private or sensitive data. In implementations, a computer server builds a dynamic virtual network of entities by calculating each entity's public (non-private) characteristics in order to group individual entities into multiple virtual temporary organizations or groups. Public characteristics may include, but are not limited to, entity scale, entity owner characteristics, entity statistics, and/or any other type of information the entity is allowed to share. In implementations, the computer server converts the entity information to mathematical vectors utilizing natural language processing, such as a word2vec algorithm, which is a natural language processing algorithm that uses a neural network model to learn word associations from a large corpus of text. In embodiments, the computer server calculates a vector distance for each entity, then groups the nearest-distance entities into a temporary organization or group which contains entities with a high number of similarities (high-similarity entities). Data from entities in a particular temporary organization can be utilized to advance machine learning.

In embodiments, for each virtual network or subset group, a computer server builds a master feature model and multiple worker models, then aggregates the results with relationships of dynamic feature weights. In implementations, a master feature model is utilized to rate all private features of an entity, and may hold overall data. However, the master feature model may not be convenient for use in continuous learning because it utilizes relatively large amounts of data when refreshed or updated. Each worker model contains partial private features and is relatively easy to refresh/update since it only utilizes minimum data to continuously learn as a supplement of the master feature model. In embodiments, a computer server (e.g., an entity server) aggregates the master feature model and the worker models to enable multi-dimension private feature learning. In implementations, the aggregated feature model weights are assigned by an entity to be initial values, but the values will dynamically change with a continuous data stream cache.

In aspects of the invention, the aggregated model (e.g., the master feature model and the worker models) is adjusted by an entity, since the learning object's private features can change anytime. For example, private features (private data) that can change over time include, but are not limited to, environment upgradation, features' scale, and data distribution. In embodiments, retraining includes a new model but with a same feature set or including a new master feature model or worker model(s) with totally new feature sets. In embodiments, a computer server (e.g., entity server) sorts retrained new models with a model metric, then chooses top N models as new master feature model and worker models sets. In implementations, the computer server also adjusts model weights with a model metric analysis equation.

In embodiments, a federated server federates entities' master feature model and worker models into a federated virtual network model (federated model) configured to predict final results to user inquiries. In implementations, the federated server identifies all master feature models and worker models of related entities in a dynamic virtual network of entities. In embodiments, federated learning utilizes a parallel computing weights equation to combine all entity models. The parallel computing weights equation can be asynchronous stochastic gradient descent (SGD) or parameter averaging, which depends on the performance cost and computing metric.

Based on the above, it can be understood that implementations of the invention utilize federated learning to generate a master machine learning model (e.g., federated model) based on models from individual entities in a network, wherein the master machine learning model may be utilized to answer inquiries for members of the network without directly obtaining private data from the individual entities within the network. Thus, embodiments of the invention address the technical problem of building and updating machine learning models when data access is limited by privacy or sensitivity concerns utilizing a technical solution including the generation of a master machine learning model.

It should be understood that, to the extent implementations of the invention collect, store, or employ personal information provided by, or obtained from, individuals (for example, private data of entity members), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
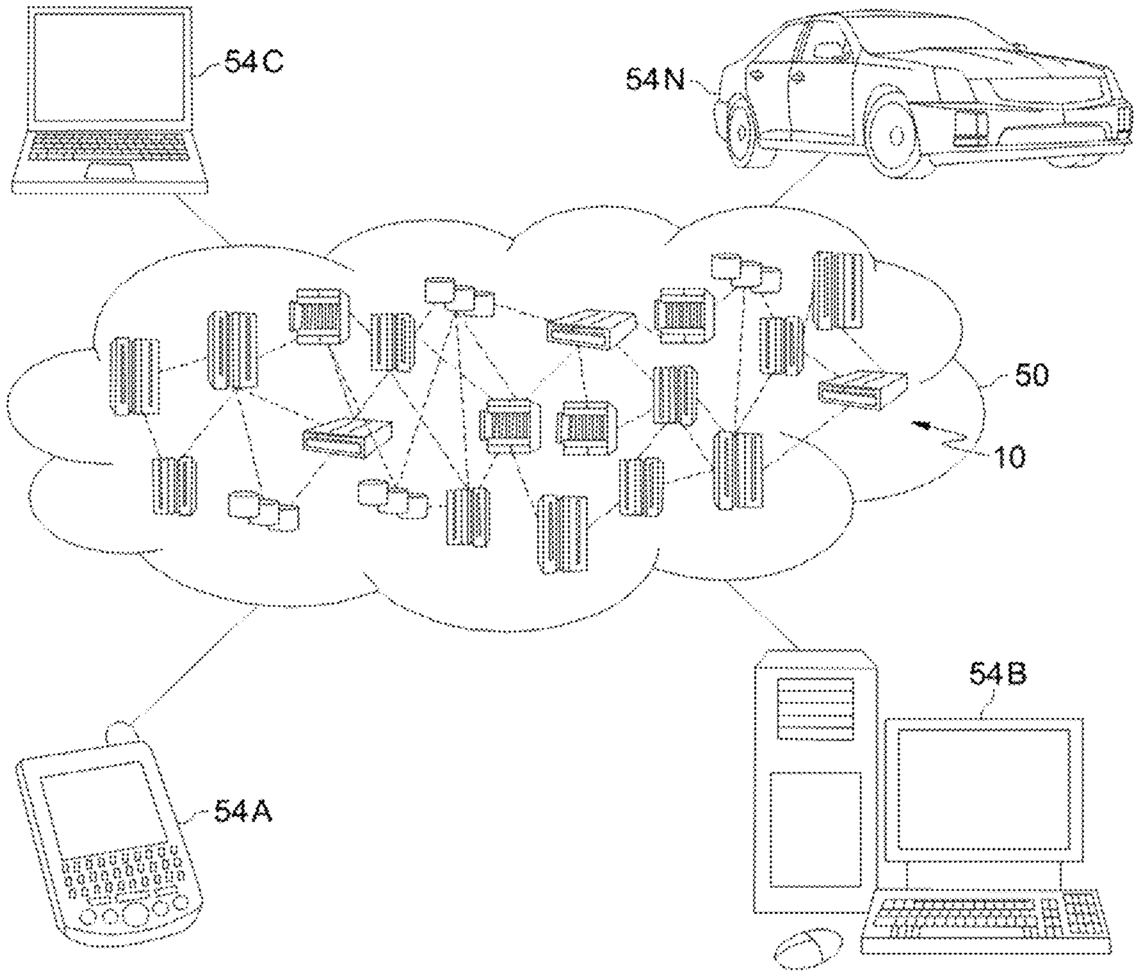
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
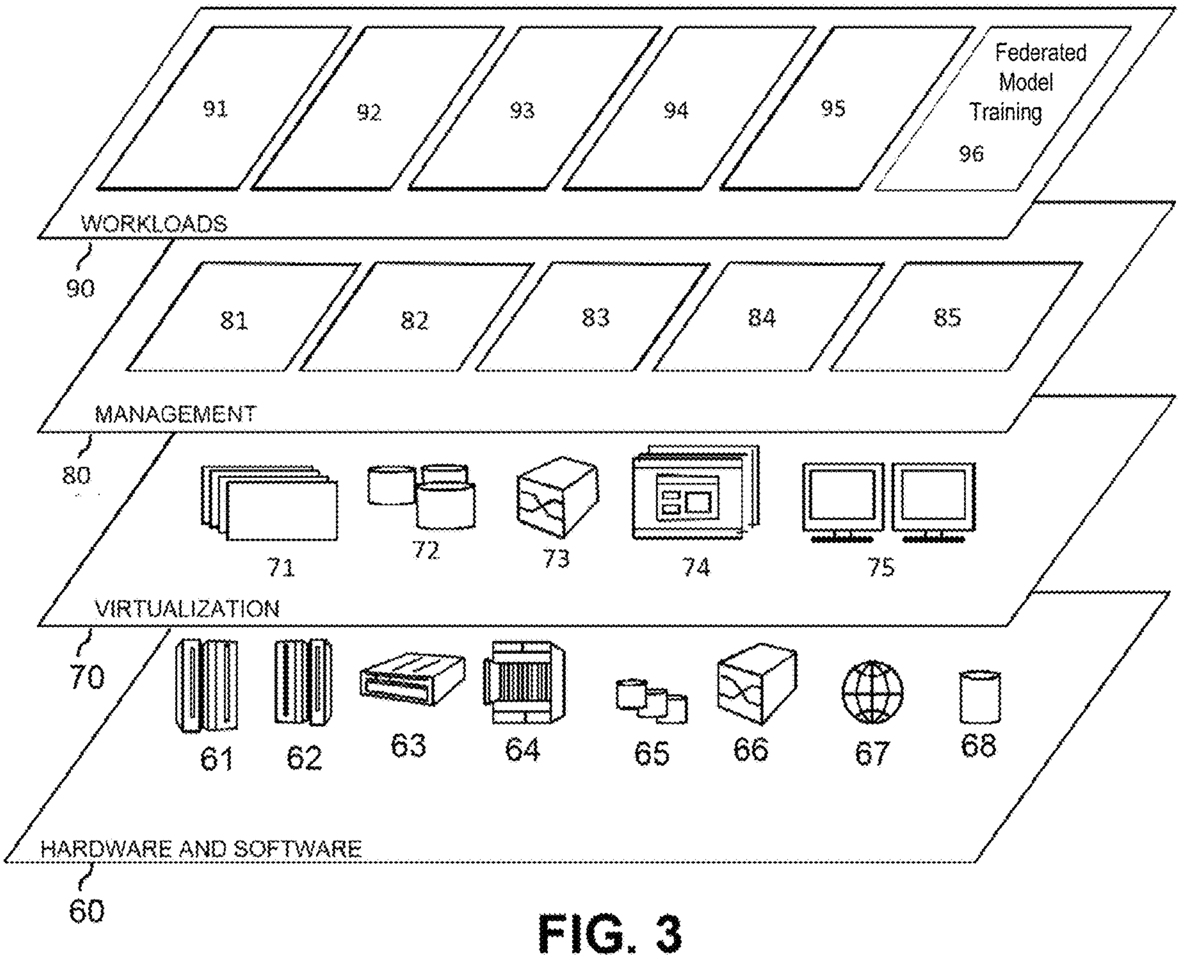
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and federated model training 96.

Implementations of the invention may include a computer system/server 12 of FIG. 1 in which one or more of the program modules 42 are configured to perform (or cause the computer system/server 12 to perform) one of more functions of the federated model training 96 of FIG. 3. For example, the one or more of the program modules 42 may be configured to: collect public information from participating entities, identify groups of related entities; build worker and master feature models for each entity in a group of related entities; monitor data caches of entities for changes indicating a change to private information; update or train worker and master feature models at the entity; generate a federated model based on the updated worker and master feature models; and generate a response to a user inquiry utilizing the federated model.

Figure 4:
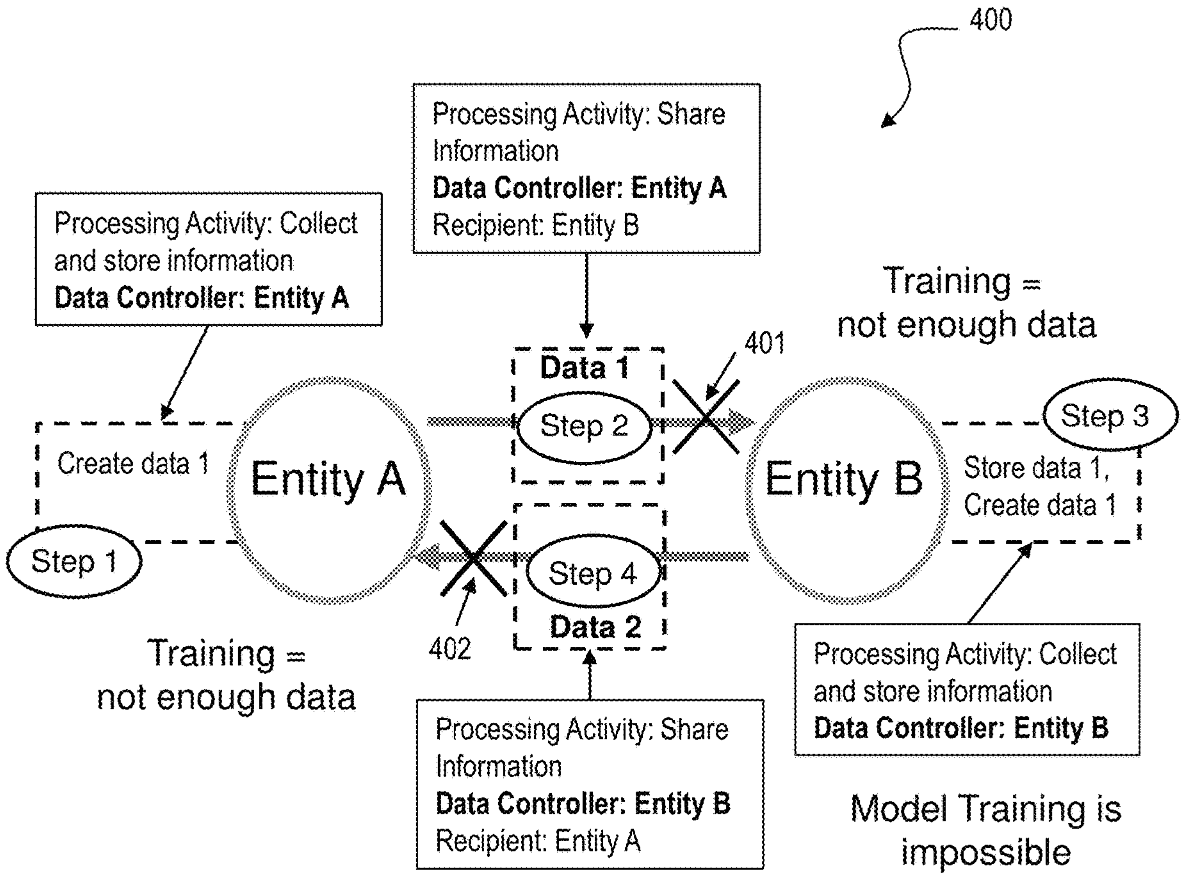
FIG. 4 is a diagram illustrating an exemplary environment wherein the flow of data between entities is limited by governance rules.

FIG. 4 is a diagram illustrating an exemplary environment 400 wherein the flow of data between entities is limited by governance rules. As illustrated, at step 1, an Entity A (first data controller) creates data 1. In a typical unrestricted data exchange, at step 2, Entity A transfers data 1 to an Entity B (second data controller); at step 3, Entity B creates data 2, and stores data 1 from Entity A; and at step 4, Entity A receives data 2 from Entity B. In the scenario of FIG. 4, the data flow from Entity A to Entity B is restricted at 401 by governance rules (e.g., GDPR rules). Likewise, the data flow from Entity B to Entity A is restricted at 402 by governance rules. In this scenario, model training at Entities A and B is impossible due to a lack of sufficient training data. Embodiments of the invention provide a technical solution to this technical problem by generating a federated model for use by multiple entities.

Figure 5:
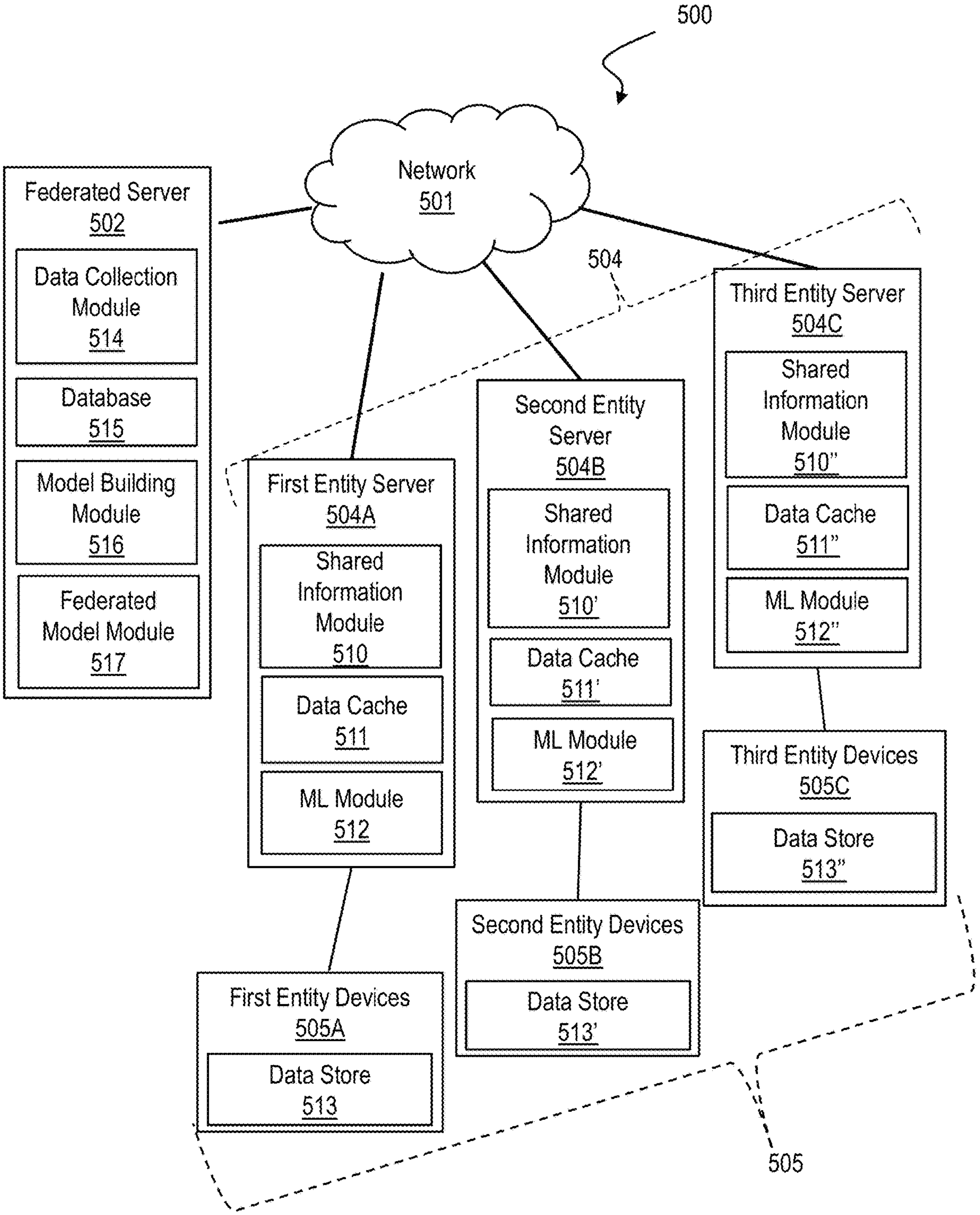
FIG. 5 shows a block diagram of an exemplary environment in accordance with aspects of the invention.

FIG. 5 shows a block diagram of an exemplary environment 500 in accordance with aspects of the invention. In embodiments, the environment 500 includes a network 501 connecting a federated server 502 with a plurality of single-entity servers 504, which are represented by a first entity server 504A, a second entity server 504B and a third entity server 504C. Each of the single-entity servers 504 may comprise one or more computing systems (e.g., the computer system 12 of FIG. 1). In embodiments the single-entity servers 504 each comprise one or more computing nodes 10 in the cloud computing environment 50 of FIG. 2. In implementations, one or more of the single-entity servers 504 comprise special purpose computing devices configured to utilize machine learning techniques to generate and update machine learning models.

The network 501 may be any suitable communication network or combination of networks, such as a local area network (LAN), a general wide area network (WAN), and/or a public network (e.g., the Internet). In implementations, the federated server 502 provides services to participating users in a cloud network.

In embodiments, the term single-entity as used herein refers to an entity governed by a distinct set of rules and/or regulations, such as a corporation, subsidiary, nonprofit organization, or governmental agency, for example. In implementations, each entity is a single-entity governed by data sharing rules preventing the sharing of certain kinds of data with other entities (e.g., policies, rules, and/or laws restrict the flow of data between entities).

In implementations, each entity server 504 is in direct or indirect communication with one or more entity devices 505, which are represented by first entity devices 505A, second entity devices 505B, and third entity devices 505C. Each of the entity devices 505 may comprise one or more computing systems (e.g., the computer system 12 of FIG. 1) and may be a desktop computer, laptop computer, tablet, smartphone, or other personal computing device, for example. In embodiments the entity devices 505 each comprise one or more computing nodes 10 in the cloud computing environment 50 of FIG. 2.

With continued reference to FIG. 5, each entity server 504 may include one or more program modules (e.g., program module 42 of FIG. 1) executed by the entity server 504 and configured to perform one or more functions described herein. In embodiments, each of the single-entity servers 504 include a shared information module (e.g., program module 42) represented at 510, 510' and 510", configured to obtain and/or transfer data between a data cache (represented at 511, 511' and 511") of the entity server 504 and other entity servers 504 and/or the federated server 502; and a machine learning (ML) module (e.g., program module 42), represented at 512, 512' and 512", configured to train a master feature model and worker models using data of the one or more entity servers 504, and to generate model output data using the locally trained master feature model and worker models. In implementations, the entity server 504 is configured to collect data (e.g., data regarding features) from a data store, represented at 513, 513', and 513", in FIG. 5.

Still referring to FIG. 5, the federated server 502 may include one or more program modules (e.g., program module 42 of FIG. 1) executed by the federated server 502 and configured to perform one or more functions described herein. In embodiments, the federated server 502 includes one or more of the following modules (e.g., program module (s) 42): a data collection module 514 configured to collect public information from multiple entity servers 504, which may be stored in a database 515; a model building module 516 configured to generate a federated model from multiple master feature and worker models; and a federated model module 517 configured to obtain user inquiries and generate and output answers to the user inquiries (e.g., inquiries from the entity servers 504 and/or entity devices 505). In implementations, the federated model module 517 is configured to answer questions in one or more subject domains, and is made available to members of a dynamic virtual network of entities identified by the federated server 502 according to embodiments of the invention.

In embodiments, separate modules described above may be integrated into a single module. Additionally, or alternatively, a single module described above may be implemented as multiple modules. Moreover, the quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5.

Figure 6:
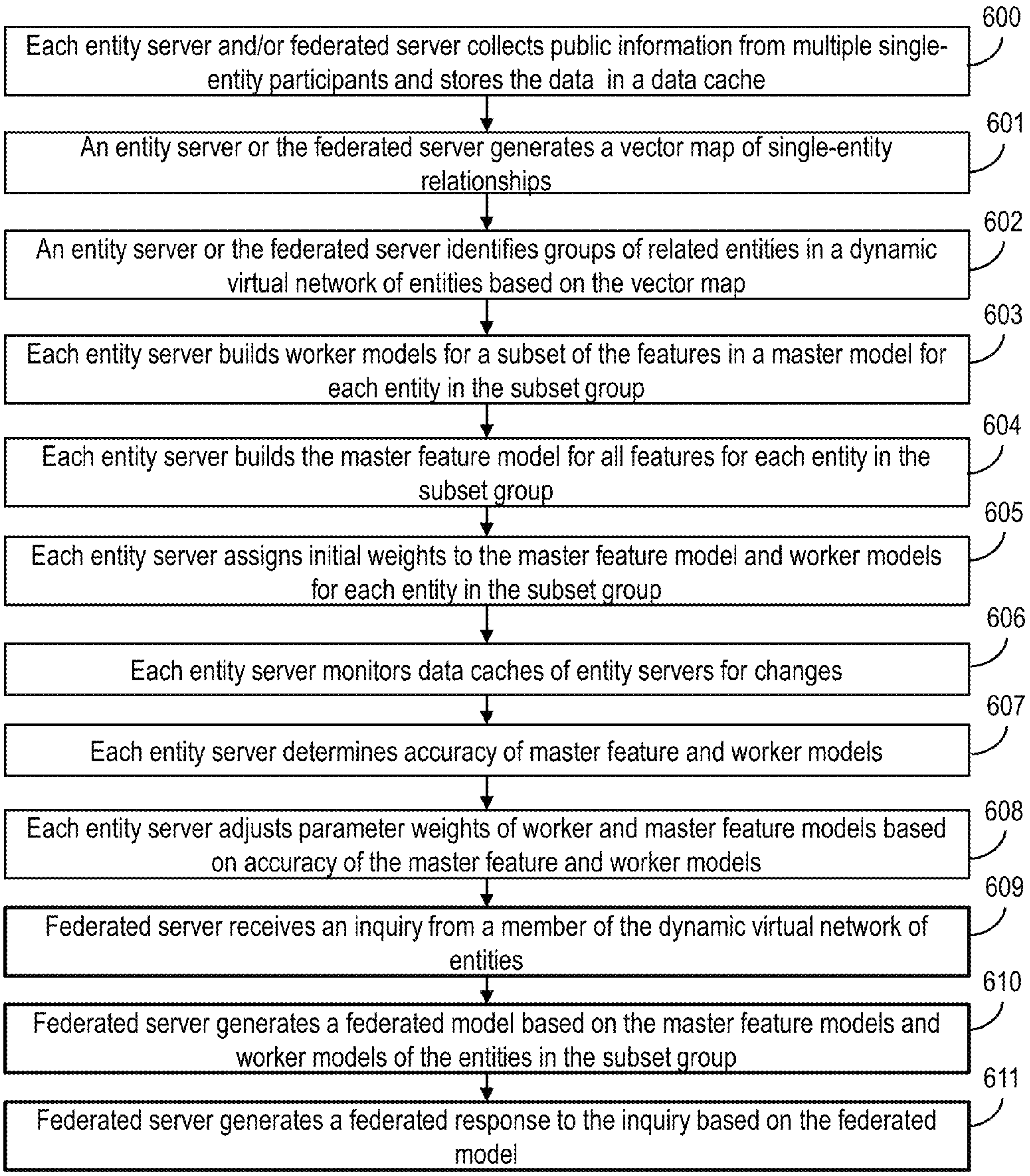
FIG. 6 shows a flowchart of an exemplary method in accordance with aspects of the invention.

FIG. 6 shows a flowchart of an exemplary method in accordance with aspects of the invention. Steps of the method may be carried out in the environment of FIG. 5 and are described with reference to elements depicted in FIG. 5.

Identifying a Dynamic Virtual Network of Entities

At step 600, each participating single-entity server (e.g., first entity server 504A), and/or the federated server 502, collects public information from multiple single-entity participants (e.g., via participating single-entity servers 504) and saves the information in a database (e.g., shared information module 510). The term public information as used herein refers to information that is not subject to restrictive sharing policies, rules or regulation. For example, public information as used herein may be information regarding features of the single-entity participants that is not private, sensitive, or otherwise restricted from being disseminated to other entities. Conversely, the term private data as used herein refers to information that is subject to restrictive sharing policies, rules or regulations. For example, private data as used herein may comprise information of an entity that is private, sensitive, or otherwise restricted from being disseminated to other entities.

With continued reference to step 600, data may be collected by each entity server (e.g., first entity server 504A, second entity server 504B, third entity server 504C) continuously or periodically, and may be cached in data blocks specific to respective single-entity participants. In the example of FIG. 6, the first entity server 504A collects public information from the second entity server 504B, and the third entity server 504C, wherein each server is associated with a participating entity. In embodiments, the public information comprises execution context data providing information regarding a context of tasks or functions executed by the individual entities. Public information may include, for example: entity scale information (e.g., data regarding the scale of an entity, or tasks and/or functions of the entity); entity owner characteristics; entity univariate statistics (e.g., statistics regarding a single variate or variable); and entity financial resources (e.g., debt, revenue, etc.). In implementations, the public information comprises any information which enables each entity and/or the federated server 502 to determine levels of similarity between the entities based on features of interest. Features of interest (hereafter features) as used herein refers to information obtained or derived from the public information that can be incorporated into a machine learning model. In implementations, the federated server 502 identifies features of multiple remote entities based on the public information obtained at step 600. In embodiments, the entity servers 504 and/or federated server 502 obtain only public features data based on predetermined rules (e.g., user selected rules). In embodiments, the shared information module (e.g., 510) of a single-entity server implements step 600. In alternative implementations, the data collection module 514 of the federated server 502 is configured to implement step 600.

In embodiments, at step 601, a single-entity server (e.g., hereafter the first entity server 504A) or the federated server 502 generates a vector map for each single-entity participant, the vector map representing relationships between the single-entity participant and other single-entity participants based on the features identified at step 600 (e.g., public information collected at step 600). In aspects of the invention, the first entity server 504A or the federated server 502 utilizes natural language processing, such as a word2vec algorithm, to generate the vector map. In embodiments, the first entity server 504A or the federated server 502 calculates a vector distance for each entity based on the vector map, then groups the nearest-distance entities into a temporary organization or subset group which contains entities with a high number of similarities (e.g., related entities). In embodiments, the first entity server 504A or the federated server 502 applies different weights to different features when generating the vector map. In implementations, the first entity server 504A or the federated server 502 utilizes the following vector equation Eq(1) to generate the vector map.

$$r(\vec{u},\vec{v})=1/d(\vec{u},\vec{v})=\|\vec{u}-\vec{v}\|=(u_1-v_1)^2+(u_2-v_2)^2 \ldots (u_n\text{-}v_n)^2. \qquad \text{Eq(1):}$$

Wherein:

$$\vec{v}=\sum_{k=0}^{N}\vec{v_k};$$

$\vec{v}$ is the vector representing the public characteristics or features of a single entity; $\vec{v}_k$ is the sub-vector (feature) representing a factor of the multi-dimension space in $\vec{v}$; N is the dimension of feature in entity $\vec{v}$; $d(\vec{u}, \vec{v})$ means the distance between entity it and entity $\vec{v}$; and $r(\vec{u}, \vec{v})$ means the relationship between entity $\vec{u}$ and entity $\vec{v}$. In embodiments, the shared information module (e.g., 510) of each entity server 504 implements step 601. In alternative embodiments, the data collection module 514 of the federated server 502 implements step 601.

Figure 7:
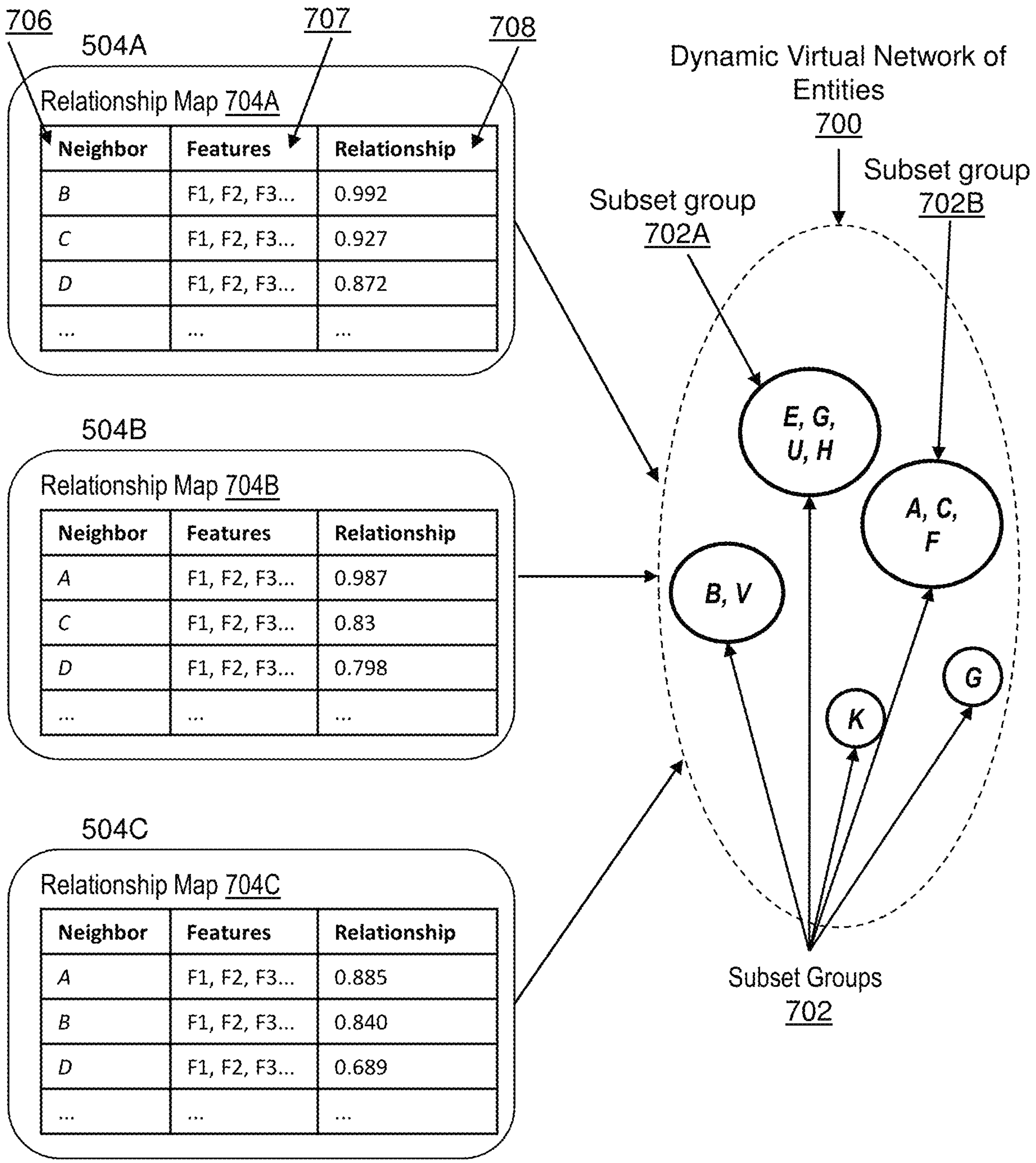
FIG. 7 shows a diagram illustrating the identification of entity groupings in accordance with aspects of the invention.

At step 602, in embodiments the first entity server 504A or the federated server 502, identifies groups of related entities (subset groups). In implementations, the first entity server 504A or the federated server 502 identifies the subset groups based on the vector maps generated at step 601. In aspects, a dynamic virtual network of entities comprising multiple subset groups is identified by the first entity server 504A or the federated server 502, based on the vector maps of step 601. In implementations, the first entity server 504A or the federated server 502 calculates the vector distance between entities and groups the entities having a nearest distance into a temporary organization (subset group) which contains high-similarity entities. In embodiments, entities are grouped based on saved rules (e.g., threshold vector distances). In embodiments, a shared information module (e.g., 510) of the first entity server 504A implements step 602. In alternative embodiments, the data collection module 514 of the federated server 502 implements step 602. An illustrated example of step 602 is shown in FIG. 7, discussed below.

It should be understood that steps 600-602 may be repeated periodically, and the subset groups within the dynamic virtual network of entities may change over time (e.g., new groupings may be added or removed), as features of one or more of the single-entities change. In embodiments, the first entity server 504A or the federated server 502 issues notifications to the participating entities indicating the groups of related entities (subset groups). The notification may be issued when changes are made to one or more of the subset groups, or when a subset group is added or removed.

Generate Master Feature Models and Worker Models

At step 603, each participating single-entity server (e.g., first entity sever 504A) of respective entities (e.g., A, C and F in FIG. 7) in a subset group (e.g., 702A in FIG. 7) builds multiple worker models (machine learning models) for a subset of the features in a master feature model. In implementations, different worker models may be based on different enterprise transactions types, employee work sites, etc. In embodiments, a first entity server 504A builds S worker models with part of the features of a master feature model, wherein S=size of partial-feature subsets. For example, when S=3, the worker models include features (e.g., FM1, FM2 and FM3 of FIG. 7) from the master feature model. In implementations, the worker models include fixed key features, such as financial status, business revenue, etc., and/or optional features such as metadata, parameters, etc. Various model building tools may be utilized to build worker models, and implementations of the invention herein are not intended to be limited by methods utilized to build machine learning models. In embodiments, the ML module (e.g., ML module 512) of each entity server (e.g., first entity server 504A) implements step 603.

At step 604, each participating single-entity server (e.g., first entity sever 504A) of respective entities (e.g., A, C and F of FIG. 7) in a subset group (e.g., 702A of FIG. 7) builds a master feature model (machine learning model) with all features (e.g., F1, F2, F3 of FIG. 7) of the worker models. Various model building tools may be utilized to build a master feature model for all features of interest (e.g., features for which information was collected at step 600), and embodiments of the invention herein are not intended to be limited by methods utilized to build machine learning models. In embodiments, the ML module (e.g., ML module 512) of each entity server (e.g., first entity server 504A) implements step 604.

In one example, a data store (e.g., 513) of a first worker device (e.g., one of entity devices 505A) includes data regarding the following database statistics features used to build a first worker model: table cardinality, page number, and access frequency. In this example, the data store of a second worker device includes data regarding the following database statistic features used to build a second worker model: index level, I/O Speed, and access frequency. Additionally, in this example the data store of a third worker device includes data regarding the following database statistics features used to build a third worker model: leaf page, page number, and system cache. In this example, some of the features of the first, second and third worker models overlap. Accordingly, the master feature model will consider all of the above features of the individual worker models. Thus, each of the worker models considers a partial feature set or subset of the total features considered by the master feature model, as illustrated in the exemplary master feature table for entities A, C and F of a subset group (e.g., 702B of FIG. 7).

| Entity | Table cardinality | Page number | Access frequency | Index level | I/O Speed | System cache | Leaf Page |
|---|---|---|---|---|---|---|---|
| A | 100~10,000 | 5~15 | 20~100 | P1 | N1 | C1 | 230 |
| C | 10,000~1,000,000 | 15~30 | 100~1500 | P2 | N2 | C2 | 331 |
| F | 1,000,000 | 30 | 1500 | P3 | N3 | C3 | 123 |

Table 1 is an exemplary table of features, illustrating features of a master feature model.

At step 605, each participating single-entity server (e.g., first entity server 504A) of respective entities (e.g., A, C and F) in a subset group (e.g., 702A) assigns weights (aggregation weights) to outputs of the master feature model and worker models. In one example, the first entity server 504 assigns a master feature model output weight of 0.5, and a worker model output weight of 0.17 to a worker model n. An initial assignment of weights by the entity servers may be based on predetermined default weights, predetermined rules, or may be assigned manually.

In embodiments, each entity in the subset group trains its master feature and worker models locally based on local data (e.g., private data). Implementations of the invention are not intended to be limited to a particular method of model training. In implementations, output data of the master feature and worker models is cached by each entity in a respective data cache that may be accessible by other participating entities (e.g., other entities in the same subset group). For example, model output data from the first entity server 504A may be saved in the data cache 511. In embodiments, the ML module (e.g., ML module 512) of each entity server (e.g., first entity server 504A) implements step 605.

Local Training

Figure 8:
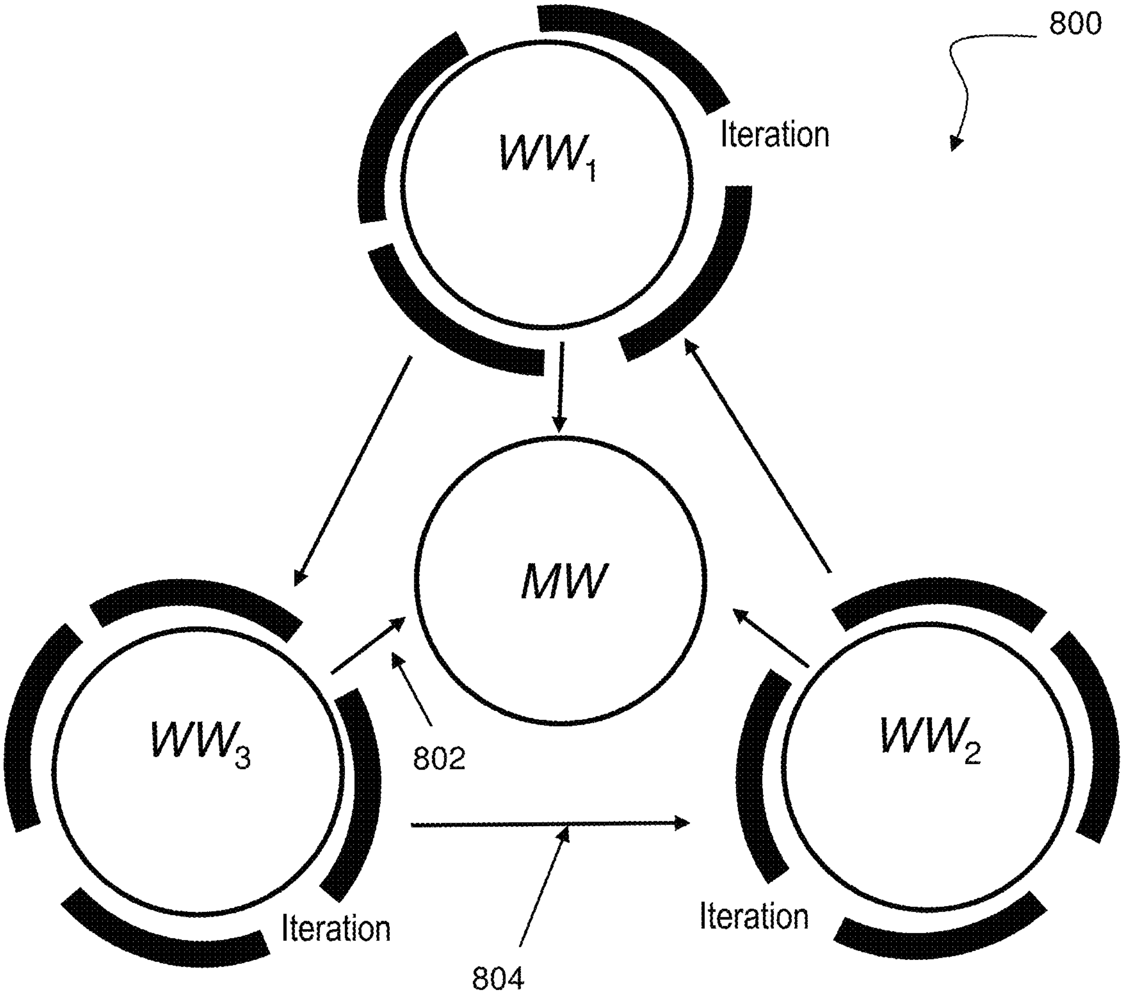
FIG. 8 illustrates aggregation of worker models and a master feature model by a single-entity in accordance with aspects of the invention.

At step 606, each participating single-entity server (e.g., first entity server 504A) identifies changes to one or more data caches (e.g., 511, 511', 511") based on monitoring of the data caches. In embodiments, the cached data of participating entities (e.g., A, C and F of subset group 702A in FIG. 7) includes model output data from aggregated master feature and worker models of the respective entity and/or from another participating entity. Data changes may include: information regarding the character of input data; values of key parameters, information regarding selected business; and observed response, for example. In one example, a first entity server 504A includes rules that identify types or categories of information that are monitored for change, such that any change to the monitored information in the data caches (e.g., 511) triggers an evaluation of the accuracy of the cached data at step 607. In implementations, cached data relates to private data, but does not disclose private data. In aspects of the invention, each participating single-entity server 504 identifies changes to cached data that indicates a change in private data (private data inputs to the master feature and worker models) at the entity side (e.g., at first entity server 504A). In implementations, the ML module (e.g., 512) of the participating single-entity server monitors incoming data according to step 606. An example of the generation of model output data using a master feature model and worker models of an entity is shown in FIG. 8, discussed below.

At step 607, each participating single-entity server (e.g., first entity server 504A) calculates the accuracy of a model ($MA^2$). See equation Eq(2) below. In embodiments, each participating single-entity server 504 initiates the calculation of the accuracy of a model when cached data associated with the model is larger than a user-specified data threshold. Various methods may be utilized to calculate model accuracy, and implementations of the present invention are not intended to be limited by the examples described herein. In implementations, the ML module (e.g., 512) of each participating single-entity server 504 implements step 607.

At step 608, each participating single-entity server (e.g., first entity server 504A) updates or adjusts the weights of the worker and master feature models (initially applied at step 605) as needed, based on predetermined rules. In statistical modeling, regression analysis is a set of statistical processes for estimating the relationships between a dependent variable and one or more independent variables. Error metrics may be calculated for regression predictive modeling. Metrics for regression involve calculating an error score to summarize the predictive skill of a model. Three error metrics that are commonly used for evaluating and reporting the performance of a regression model include: Mean Squared Error (MSE); Root Mean Squared Error (RMSE); and Mean Absolute Error (MAE). In implementations, when each participating single-entity server 504 determines that cached data in a data cache (e.g., 511) is larger than a user-specified data threshold, it initiates a calculation of model accuracy or model metric ($MA^2$) on the cached data, and adjusts the weight of worker models using the following equation Eq(2).

$$\text{cached\_WW}_i = \frac{MA_i^2}{\sum_j MA_j^2} * \sum_j WW_j \qquad \text{Eq (2)}$$

Figure 9:
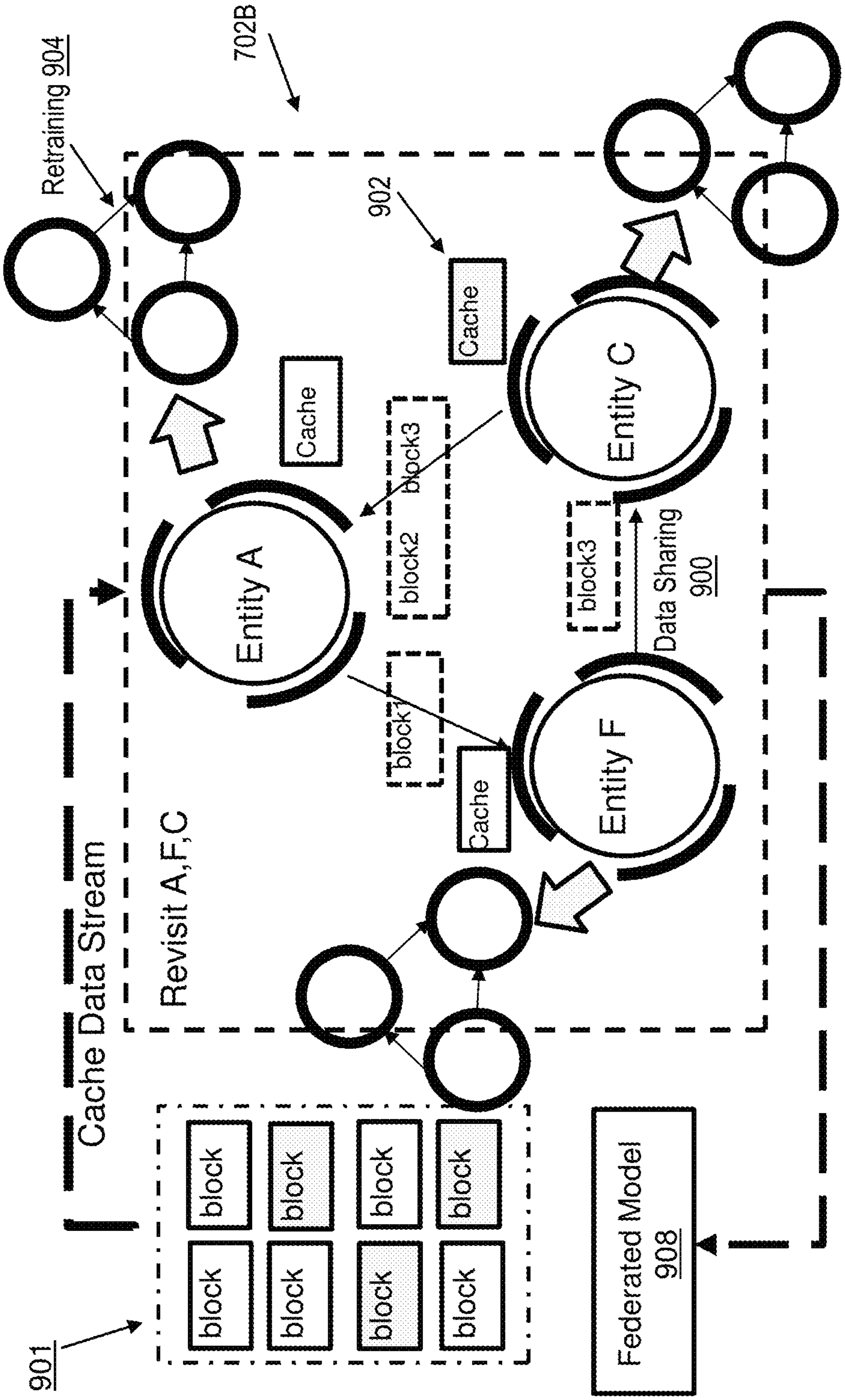
FIG. 9 illustrates the data caches of a subset group in accordance with aspects of the invention.

In implementations, one of the following error metrics may be utilized as the model metric ($MA^2$): Mean Squared Error (MSE), Root Mean Squared Error (RMSE), or Mean Absolute Error (MAE). In the this example, $WW_i$ in equation Eq(2) represents an adjusted i worker model weight (since new data comes to the entity, the worker model weights in this entity will need to be adjusted), and $WW_j$ represents the other worker model weights (1 to j), not including i. Similarly, the master feature model of the entity utilizes the same strategy as the worker models. When equation Eq(2) represents the master feature model weight adjustment, cached WW can be converted to use cached MW, which is the adjusted master model weight, and WW(j) then indicates all worker models (from 1 to j, including i) since master feature model weight will be adjusted by all worker models. Accordingly, in embodiments of the invention each participating single-entity server 504 adjusts the weights of the worker and master feature models for the associated entity based on the calculated accuracy of the cached data. In implementations, the ML module (e.g., 512) of each participating single-entity server (e.g., 504A) implements step 608. An illustrative example of the generation of new model data by related entities for use in model training is depicted in FIG. 9, discussed below.

Federated Models

At step 609, the federated server 502 receives an inquiry from a participating member of the subset group. For example, an employee of entity A of subset group 702B in FIG. 7 may utilize a graphical user interface (GUI) provided by the federated server 502, to submit an inquiry to the federated server 502 that may be addressed by federated machine learning models. In implementations, the federated server 502 identifies master feature and worker models associated with the participating member. Participating members of the dynamic virtual network of entities 700 may register with the federated server 502, and the federated server 502 may identify the participating member based on login information provided by the participating member to access machine learning services of the federated server 502. For example, the member may belong to entity A in subset group 702B. In this example, the federated server 502 would obtain and utilize the master feature and worker models associated with the subset group 702B to generate an output (federated prediction) in response to the inquiry. In embodiments, the federated model module 517 implements step 609.

At step 610, the federated server 502 builds a federated model based on the master feature models and worker models of each of the entities in the subset group (e.g., subset group 702B in FIG. 7) of the participating members. In implementations, the federated server 502 identifies and obtains all master feature and worker models in the subset group. For example, for an inquiry from an employee of entity A, in subset group 702B, the federated server 502 obtains and utilizes the master feature models and worker models of entities A, C and F. In implementations, federated server 502 may build a federated model before receiving the inquiry from the participating member, or in response to the inquiry. Implementations of the invention are not intended to be limited to the manner in which the federated server 502 obtains the master feature models and worker models form the entities in the subset group. In implementations, the model building module 516 of the federated server 502 implements step 610, and stores the federated model in the federated model module 517. In implementations, federated models stored by the federated server 502 are available for use by members of the dynamic virtual network of entities 700.

In embodiments, each participating single-entity server (e.g., first entity server 504A) manages a cache of master feature and worker models. In implementations, each participating single-entity server continuously or periodically calculates the accuracy of active models (models in use by entities) based on cached data by model metric in accordance with step 607, continuously builds new master feature and worker models as needed based on changes to cached data blocks of respective entities (e.g., data caches 511, 511', 511'), and caches the master feature and worker models with an accuracy larger than a threshold, $T_{acc1}$, for use by the federated server 502 in generating federated models. In implementations, when the average accuracy of active master feature and worker models is less than threshold $T_{acc1}$, the federated server 502 utilizes (mixes) active models and cached models at step 610. In embodiments, the federated server 502 sorts mixed active models and cached models by accuracy, and selects a top S number of active models as a new active model list for use in generated federated models at step 610. In aspects of the invention, each entity server 504 assigns weights for selected active models based on the accuracy of the models, or utilizes the adjustment equation Eq(2) to adjust weights of models, or reuses previously assigned weight for models. An illustrative example of federating master feature models to generate a federated model is presented in FIG. 10, discussed below. An illustrative example of federating worker models to generate a federated model is presented in FIG. 11, discussed below.

At step 611, the federated server 502 generates a response (federated prediction) utilizing an appropriate federated model identified at step 610, and outputs the response to the participating member in response to the inquiry received at step 609. In embodiments, the federated model module 517 of the federated server 502 implements step 611.

Unless otherwise stated, steps of FIG. 6 can be performed in a different order than depicted in FIG. 6. Additionally, it should be understood that steps of FIG. 6 performed by multiple entity servers 504 need not be performed by each of the entity servers at the same time. Instead, each of the single-entity servers 504 may perform the steps indicated independently of one another.

FIG. 7 is a diagram illustrating the identification of entity groupings in accordance with steps 601 and 602 of FIG. 6. Steps represented in FIG. 7 may be carried out in the environment of FIG. 5 and are described with reference to elements depicted in FIG. 5.

In the exemplary scenario of FIG. 7, the federated server (e.g., federated server 502 of FIG. 5) identifies a dynamic virtual network of related entities 700, including five subset groups 702. More specifically, the federated server 502 obtains public data from the first entity server 504A, the second entity server 504B and the third entity server 504C, and generates respective relationship maps 704A, 704B and 704C. As illustrated in FIG. 7, each relationship map for a primary single-entity participant identifies other single-entity participants (e.g., Neighbor 706), features (e.g., Features 707) of the other single-entity participants, and a relationship parameter (e.g., Relationship 708) quantifying the similarities between the features of the primary single-entity participant and the features of the other single-entity participants. For example, relationship map 704A indicates that features F1, F2 and F3 of other entities B, C and D result in: a relationship parameter between single-entity A and single-entity B of 0.992; a relationship parameter between single-entity A and single-entity C of 0.927; and a relationship parameter between single-entity A and single-entity D of 0.0.872.

In the example of FIG. 7, the relationship mapping results in five distinct subset groups 702 including: entities B and V, entities E, G, U and H (subset group 702A), entities A, C and F (subset group 702B), entity K, and entity G, based on information obtained from single-entities A-V. In this example, single-entities K and G do not have relationship parameters that meet minimum threshold values required to be grouped with another single-entity participant. That is, features of single-entities K and G are not similar enough to features of other single-entity participants for the federated server 502 to group them with the other single-entity participants.

FIG. 8 illustrates aggregation of worker models and a master feature model by a single-entity in accordance with embodiments of the invention, to generate and cache model outputs which may be monitored for changes at step 606 of FIG. 6. In the example of FIG. 8, a machine learning execution environment 800 for an entity (e.g., entity A) includes a first worker model, a second worker model $WW_2$, a third worker model $WW_3$, and a master feature model MW. Outputs of the worker models $WW_1$, $WW_2$, $WW_2$ are provided to the master feature model MW, as indicated at 802, for example, and may also be used as inputs to other worker models, as indicated at 804, for example. In implementations, an entity (e.g., entity A) may generate a prediction (e.g., response to an inquiry) based on its master feature model and worker models. In implementations, a master response is predicted using equation by applying a master feature model; each worker response is predicted by applying a corresponding worker model, and results from the master feature model and the worker models are aggregated by a single-entity server (e.g., first entity server 504A) to obtain a final prediction using the following equation Eq(3).

$$\text{Prediction}=MW*MR+\Sigma_{i=1\ to\ S}WW_i*WR_i \quad \text{Eq(3):}$$

Wherein $WW_i$ an adjusted i worker model weight, MR is an output (response) of the master feature model, $WR_i$ is an output (response) of a worker model, and S is the size of partial-feature subsets, where i=1 to S. In one example, initial MW=0.5 and the initial $WW_i$=0.17.

FIG. 9 illustrates data caches of a subset group in accordance with embodiments of the invention, which may be monitored in accordance with step 606 of FIG. 6. In the example of FIG. 9, a subset group 702B comprising entities A, C and F is depicted. As illustrated in FIG. 9, model outputs shown as new blocks of data (e.g., block 1, block2, block3) are generated by the respective entities A, B and C, and may be shared between the entities, as represented at 900, for example. In embodiments the master feature and worker models of respective entities A, B and C utilize private data inputs to generate model outputs. The new data is saved to at least one data cache 901, as indicated at 902. The new blocks of data in the at least one data cache 901 may be utilized by each entity A, B and C to train master feature and worker models of each entity, as indicated at 904, for example. As local master feature and worker models are trained by the entities A, C and F, model outputs of the entities are improved (provide more accurate responses/predictions). Accordingly, the federated server 502 may utilize updated/trained master feature and worker models of the entities A, B and C to generate a federated model 908, as discussed in more detail below.

Figure 10:
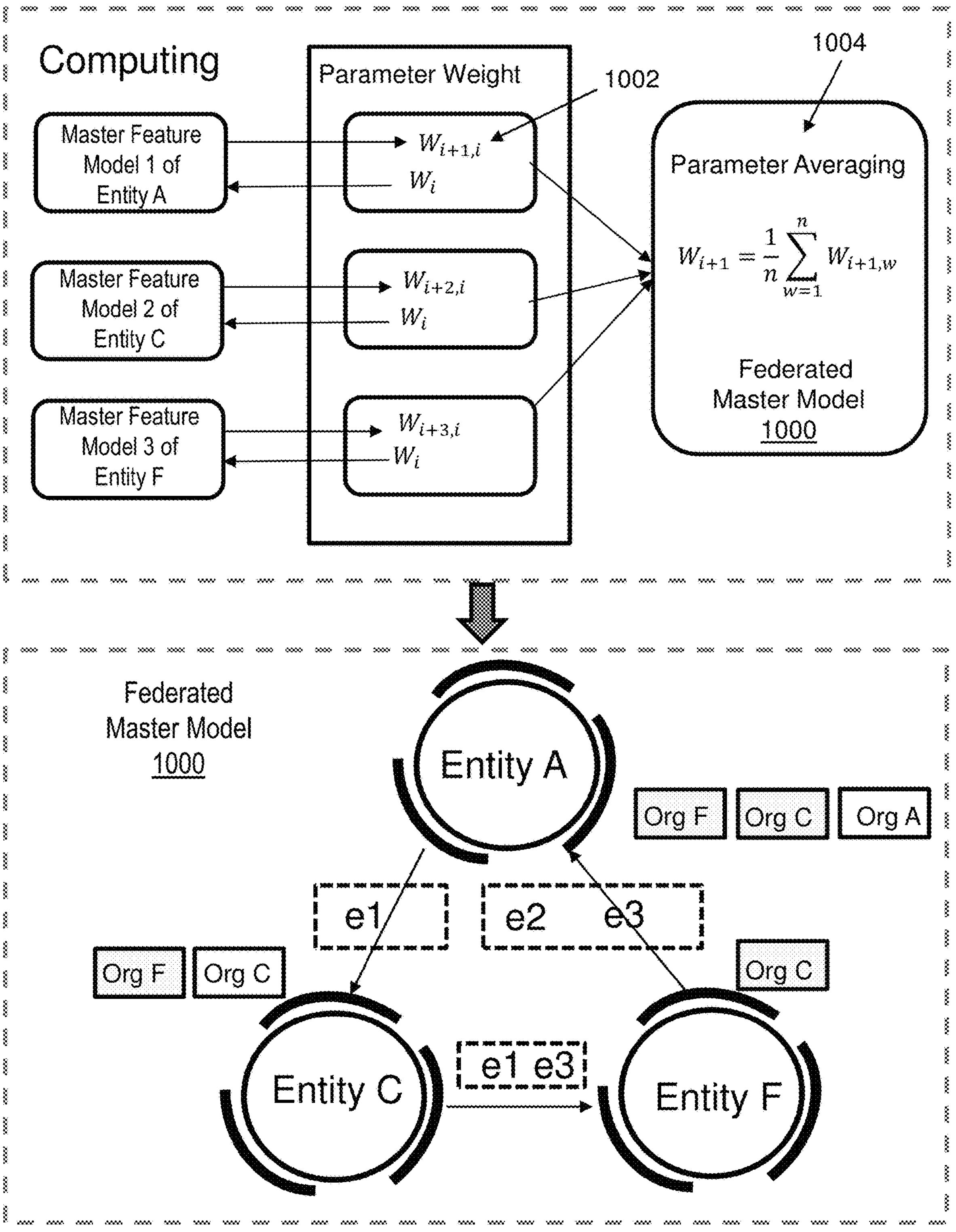
FIG. 10 shows a diagram illustrating the generation of a federated model in accordance with aspects of the invention.

FIG. 10 is a diagram illustrating the generation of a federated model 1000 in accordance with step 610 of FIG. 6. In the example of FIG. 10, the federated server 502 generates the federated model 1000 for subset group 702B of the dynamic virtual network of entities 700 in FIG. 7, which includes entities A, C and F. FIG. 10 depicts aggregated master feature and worker model outputs e1, e2, and e3 generated by the entities A, C and F, which may be shared between the entities for model training purposes. Each master feature model (e.g., master models 1-3) applies weights W, to parameters, and provides a weighted output indicated at 1002. In implementations, the federated server 502 uses a parallel computing weights equation to combine all master feature models of a subset group (e.g., 702B). The equation can be stochastic gradient descent (SGD) or parameter averaging (indicated at 1004 in FIG. 10), depending on the performance costs and computing metric. In implementations, the federated server 502 generates a federated model utilizing the following parameter averaging equation Eq(4).

$$W_{i+1} = \frac{1}{n}\sum_{w=1}^{n} W_{i+1,w} = \frac{1}{n}\sum_{w=1}^{n}\left(W_i - \frac{\alpha}{m}\sum_{j=(w-1)m+1}^{wm}\frac{\partial L^j}{\partial W_i}\right) = W_i - \frac{\alpha}{nm}\sum_{j=1}^{nm}\frac{\partial L^j}{\partial W_i} \quad \text{Eq (4)}$$

Figure 11:
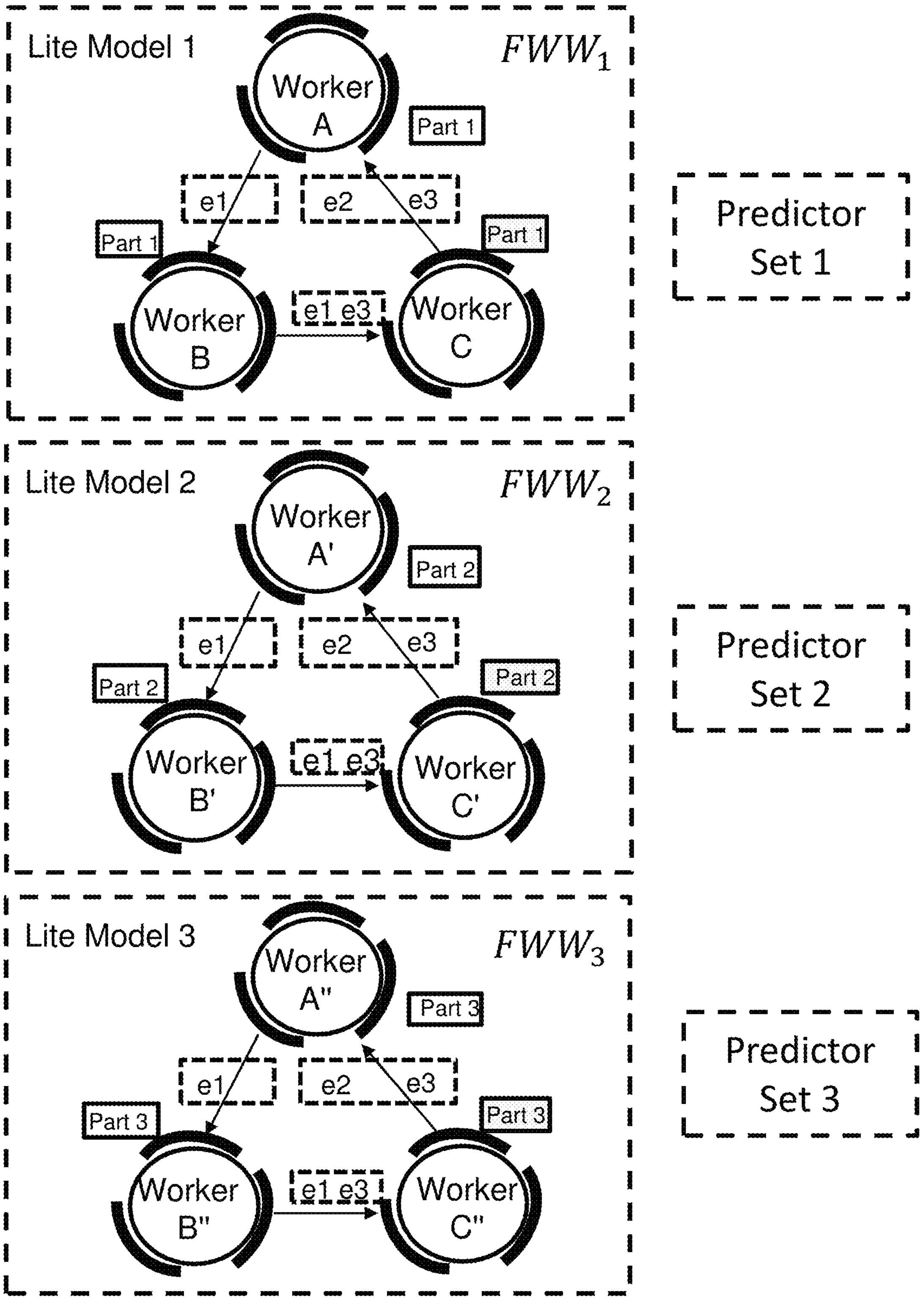
FIG. 11. illustrates the use of federated worker models in accordance with aspects of the invention.

FIG. 11 illustrates the use of federate worker models in accordance with step 610 of FIG. 6. With the machine learning federated model 1000, worker models are built with partial features. In the example of FIG. 11, worker models FWW1, FWW2, and FWW3 of respective entities (e.g., A, F and C) are utilized to generate respective predictor sets 1-3. FIG. 11 depicts worker model outputs e1, e2, and e3 generated by the workers (e.g., workers A-C) of each entity, which may be shared between the entities for model training purposes. In embodiments, the federated server 502 utilizes the following equation Eq(5) to obtain a federated prediction.

$$Federated_{Prediction} = \sum_{k=1\ to\ N}\left(FMW_k * MW_k * MR_k + FWW_k \sum_{i=1\ to\ S} WW_{k,i} * WR_{k,i}\right) \quad \text{Eq (5)}$$

Wherein FMW is the federated model, MW is the weight for a master model, MR is a master feature model output, FWW is the combined/federated worker models, WW is an initial weight for a master feature model, and WR is a worker model output.

Figure 12:
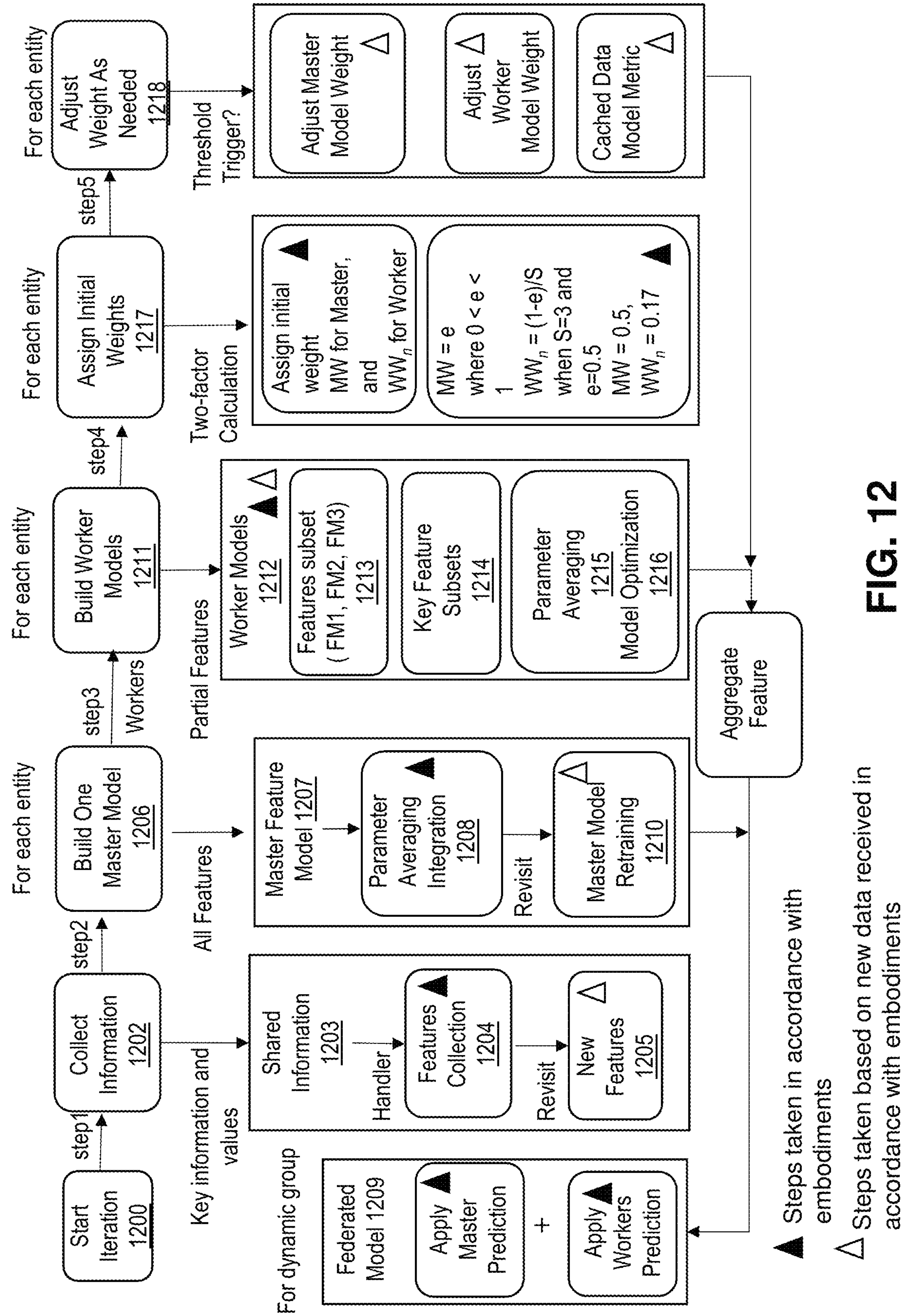
FIG. 12 illustrates a workflow in a federated system of machine learning models in accordance with aspects of the invention.

FIG. 12 illustrates a workflow in a federated system of machine learning models in accordance with aspects of the invention. Steps of FIG. 6 are illustrated in FIG. 12, and may be performed in the environment 500 of FIG. 5. It should be understood that multiple iterations of the workflow depicted in FIG. 12 result in continuous learning of the machine learning models of the invention.

At the start of an iteration 1200, a first entity server 504A of an entity (e.g., entity A) collects at 1202 public or shared information 1203 regarding other participating entities (e.g., C and F of subset group 702B). The first entity server 504A may collect information at 1202 in accordance with step 600 of FIG. 6. The first entity server 504A may store information regarding features of the entities as features collection 1204 in a database. As new information is collected at 1202, the first entity server 504A may identify new features 1205 to be added to new master feature and worker models.

Still referring to FIG. 12, at 1206 the first entity server 504A builds one master feature model 1207, incorporating all features of interest identified by the first entity server 504A. The federated server 504 may combine (federate) features from related master feature models 1207 utilizing parameter averaging integration 1208 to obtain a federated master feature model for use in the federated model 1209. Step 1206 may be implemented in accordance with step 604 of FIG. 6. The master feature model 1207 for an entity may be retrained by that entity (e.g., first entity server 504A) as indicated at 1210. In implementations, the entity selects a subset group of features for partial calculation and starts a regression iteration. In embodiments, the entity leverages previous features of the master feature model 1207, but collects more detailed information (e.g., private or sensitive information) at the entity location. Additional information may include values of key parameters; business configuration information (e.g., financial, cloud usage, etc.); and/or information regarding characteristics of input data, for example. In aspects, the entity (e.g., first entity server 504A) builds a regression model for the relationship between features and a target. In implementations, the entity (e.g., entity A) may utilize the following equation Eq(6):

Eq(6): Y=F(X), where Y is a target value, X is an input feature value, and F is a function.

At 1211 in FIG. 12, the first entity server 504A builds multiple worker models 1212. Each worker model is built for a features subset 1213 comprising a subset of the total features of the master features model 1207. In implementations, 1211 may be performed in accordance with step 603 of FIG. 6. In the example of FIG. 12, a worker model is built for features FM1, FM2 and FM3, wherein S is the size of the partial feature subset, and S=3. In embodiments, worker models are built for key feature subsets 1214, wherein key features are fixed features that are always utilized in modeling (as opposed to optional features which may be modeled). In embodiments, the federated server (e.g., 502 of FIG. 5) combines features from worker models 1212 utilizing parameter averaging integration 1215 (i.e., federates worker models from different entities) for use in the federated model 1209. The first entity server 504A may optimize worker models by adjusting weights of the worker models as depicted at 1216, and in accordance with step 608 of FIG. 6.

At 1217, the first entity server 504A assigns initial weights to the master feature model and worker models. Step 1217 may be implemented in accordance with step 605 of FIG. 6. In the example of FIG. 12, the master feature model is assigned an initial weight MW and the worker models have an initial weight WWn. In this example, MW=e, wherein e is greater than zero but less than one, and WWn=(1−e)/S. For example, when S=3 and e=0.5, MW=0.5 and $WW_n$=0.17.

At 1218, the first entity server 504A adjusts model weights, as needed. Step 1218 may be implemented in accordance with step 608 of FIG. 6. In implementations, if the size of a data cache of the entity meets a threshold trigger size, the first entity server 504A calculates the accuracy of the current master feature model and worker models and adjusts weights of the models according to the accuracy.

Advantageously, embodiments of the invention build dynamic virtual networks of related entities to share individual machine learning models of the entities. In implementations, at the feature level, master feature models and worker models are built with relationships of dynamic feature weights. In embodiments, at the model level, a federated distributed system continuously learns based on iterative calculations from individual sensitive data models.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

continuously identifying, by a computing device, features derived from public information of individual entities in a dynamic virtual network;

grouping, by the computing device, related entities in the dynamic virtual network into a networked group of entities, wherein the networked group of entities change based on changes in the features of the individual entities, and wherein the networked group of entities is determined based on vector map representations of the features derived from the public information of the individual entities;

monitoring, by the computing device, cached data of an entity in the networked group of entities for changes in data, wherein the cached data includes model output data from worker models having a first accuracy score that exceeds a first threshold and a master feature model of the entity having a second accuracy score that exceeds a second threshold, wherein the worker models and the master feature model comprise machine learning models, and wherein the model output data from the master feature model and the worker models is generated based on private data inputs from the entity that are not accessible by a federated model in a remote federated server, the federated model based on the master feature model and the worker models of entities in the networked group;

dynamically detecting, by the computing device, deviations between current cached model output data and prior cached model output data, the detected deviations indicating changes in the private data inputs;

in response to determining that the detected deviations exceed a deviation threshold, triggering model accuracy evaluation of the cached data;

in response to the triggering, continuously evaluating, by the computing device, the first accuracy score and the second accuracy score;

iteratively updating, by the computing device, parameter weights of the worker models and the master feature model based on the evaluating, to generate updated worker models having at least the first accuracy score and an updated master feature model having at least the second accuracy score;

providing, by the computing device, the updated worker models having at least the first accuracy score and the updated master feature model having at least the second accuracy score to the remote federated server for use in the federated model incorporating the updated worker models and the updated master feature model of the entity with other updated master feature models and other updated worker models of other entities in the networked group of entities; and responsive to an inquiry from a participating member of the networked group of entities, receiving, by the computing device, a federated response from the remote federated server based on the federated model without accessing the private data inputs.

2. The method of claim 1, further comprising:

building, by the computing device, the worker models, wherein the worker models each include a subset of a set of features associated with the entity; and building, by the computing device, the master feature model, wherein the master feature model comprises all features in the set of features associated with the entity.

3. The method of claim 1, further comprising generating, by the computing device, a model output utilizing parameter averaging integration of the master feature model and the worker models of the entity.

4. The method of claim 1, further comprising assigning, by the computing device, initial parameter weights to the worker models and the master feature model based on predetermined rules.

5. The method of claim 1, wherein the model output data from the master feature model and the worker models is further generated based on a combination of the private data inputs by the entity and public data inputs by the entity, and wherein the public data inputs are converted into mathematical vectors using a neural network model to derive word associations from the public data inputs.

6. The method of claim 1, further comprising:

sending, by the computing device, the inquiry from the participating member of the networked group of entities to the remote federated server, wherein the networked group of entities are formed based on a specific number of similarities between entities using a calculated vector distance between the entities.

7. The method of claim 1, further comprising determining, by the computing device, accuracy scores of the worker models and the second accuracy score of the master feature model of the entity, wherein the iteratively updating the parameter weights of the worker models and the master feature model of the entity is further based on the second accuracy score of the master feature model and the accuracy scores of the worker models of the entity, and wherein the accuracy scores of the worker models are determined using a regression analysis.

8. A computer program product comprising one or more computer readable storage media having program instructions collectively stored on the one or more computer readable storage media, the program instructions executable by a computing device to:

continuously identify features derived from public information of individual entities in a dynamic virtual network;

group related entities in the dynamic virtual network into a networked group of entities, wherein the networked group of entities change based on changes in the features of the individual entities, and wherein the networked group of entities is determined based on vector map representations of the features derived from the public information of the individual entities;

monitor cached data of an entity in the networked group of entities for changes in data, wherein the cached data includes output data from worker models having a first accuracy score that exceeds a first threshold and a master feature model of the entity having a second accuracy score that exceeds a second threshold, wherein the worker models and the master feature model comprise machine learning models, and wherein the model output data from the master feature model and the worker models is generated based on private data inputs from the entity that are not accessible by a federated model in a remote federated server, the federated model based on the master feature model and the worker models of entities in the networked group;

dynamically detect deviations between current cached model output data and prior cached model output data, the detected deviations indicate changes in the private data inputs;

in response to the detected deviations exceeding a deviation threshold, trigger model accuracy evaluation of the cached data;

in response to the trigger, continuously evaluate the first accuracy score and the second accuracy score;

iteratively update parameter weights of the worker models having at least the first accuracy score and the master feature model based on the evaluation, to generate updated worker models and an updated master feature model having at least the second accuracy score;

provide the updated master feature model having at least the second accuracy score and the updated worker models having at least the first accuracy score to the remote federated server for use in the federated model incorporating the updated master feature model and the updated worker models of the entity with other updated master feature models and other updated worker models of other entities in the networked group of entities; and responsive to an inquiry from a participating member of the networked group of entities, receive a federated response from the remote federated server based on the federated model without accessing the private data inputs.

9. The computer program product of claim 8, wherein the program instructions are further executable by the computing device to:

generate, using a natural language processing algorithm, a vector map representing relationships between entities in the networked group of entities based on features of the respective entities and weights applied thereto;

calculate a vector distance for each entity based on the vector map; and identify a group of related entities based on the calculated vector distance meeting a threshold vector distance criteria, wherein the networked group of entities comprises the group of related entities, and wherein each entity in the group of related entities is associated with a set of features, the set of features including one or more from a group consisting of financial status, revenue, and metadata associated with the entity.

10. The computer program product of claim 9, wherein the program instructions are further executable by the computing device to identify the features of multiple remote entities based on only public information of the multiple remote entities.

11. The computer program product of claim 8, wherein the program instructions are further executable by the computing device to:

build the worker models, wherein the worker models each include a subset of the features associated with the entity; and build the master feature model, wherein the master feature model comprises all features in the set of features associated with the entity.

12. The computer program product of claim 8, wherein the program instructions are further executable by the computing device to generate a model output based on the worker models and the master feature model of the entity.

13. The computer program product of claim 8, wherein the program instructions are further executable by the computing device to assign initial parameter weights to the worker models and the master feature model of the entity based on predetermined rules.

14. The computer program product of claim 8, wherein the model output data from the worker models and the master feature model is further generated based on a combination of the private data inputs by the entity and public data inputs by the entity, and wherein the public data inputs are converted into mathematical vectors using a neural network model to derive word associations from the public data inputs.

15. The computer program product of claim 8, wherein the program instructions are further executable by the computing device to:

send the inquiry from the participating member of the networked group of entities to the remote federated server, wherein the networked group of entities are formed based on a specific number of similarities between entities using a calculated vector distance between the entities.

16. The computer program product of claim 8, wherein the federated model is generated utilizing parameter averaging integration of the updated master feature model and the updated worker models of the entity and the other updated master feature models and the other updated worker models of the other entities in the networked group of entities.

* * * * *